(12) United States Patent
Rajagopalan et al.

(10) Patent No.: US 6,919,395 B2
(45) Date of Patent: Jul. 19, 2005

(54) GOLF BALL COMPOSITIONS COMPRISING NANOPARTICULATES

(75) Inventors: Murali Rajagopalan, South Dartmouth, MA (US); Mitchell E. Lutz, Fairhaven, MA (US); Peter R. Voorheis, Fall River, MA (US)

(73) Assignee: Acushnet Company, Fairhaven, MA (US)

( * ) Notice: Subject to any disclaimer, the term of this patent is extended or adjusted under 35 U.S.C. 154(b) by 43 days.

(21) Appl. No.: 10/037,987

(22) Filed: Jan. 4, 2002

(65) Prior Publication Data

US 2003/0130061 A1 Jul. 10, 2003

(51) Int. Cl.$^7$ .................. A63B 37/06; A63B 37/00; C08K 3/22
(52) U.S. Cl. ............... 524/432; 473/354; 473/356; 473/371; 473/372; 473/373; 473/374; 473/376; 473/377; 473/378; 473/385
(58) Field of Search ................. 524/432; 473/354, 473/356, 371, 372, 373, 374, 376, 377, 378, 385

(56) References Cited

U.S. PATENT DOCUMENTS

| | | | | | |
|---|---|---|---|---|---|
| 3,359,231 A | * | 12/1967 | Kent | .......... | 524/493 |
| 4,611,810 A | * | 9/1986 | Kamata et al. | .......... | 473/372 |
| 5,885,172 A | * | 3/1999 | Hebert et al. | .......... | 473/354 |
| 6,454,666 B1 | * | 9/2002 | Shira | .......... | 473/377 |
| 6,710,114 B2 | * | 3/2004 | Bissonnette et al. | .......... | 524/493 |
| 2001/0024982 A1 | * | 9/2001 | Cavallaro et al. | .......... | 473/377 |
| 2003/0100656 A1 | * | 5/2003 | Majumdar et al. | .......... | 524/445 |

FOREIGN PATENT DOCUMENTS

| | | | |
|---|---|---|---|
| JP | 11244419 | * | 9/1999 |
| WO | WO 01/43832 | * | 6/2001 |
| WO | 00202193 WO | | 1/2002 |
| WO | 00209823 WO | | 2/2002 |

OTHER PUBLICATIONS

Thain, Science and Golf IV; Jul. 2002; pp. 319–327.*
Dagani, R. "Building from the Bottom Up," Chemical & Engineering News, Oct. 16, 2000, p. 27.
Sherman, L. M. "Nanocomposites a Little Goes a Long Way," Plastics Technology, Jun. 1999, p. 52.
Dagani, R. "Putting the 'Nano' Into Composites," Science Technology, Jun. 7, 1999, vol. 77, no. 23, pp. 25–37.
Petrovic, Z. S.; Javni, I.;Waddon, A. "Polyurethane Elastomers With Nano–Fillers", Conference Proceedings at ANTEC 1998, Atlanta, Georgia, Apr. 26, 1998, p. 225.
Kressler, J.; Thomann, R. "Nanocomposites Based on a Synthetic Layer Silicate and Polyamide–12," Conference Proceedings at ANTEC 1998, Atlanta, Georgia, Apr. 26, 1998, p. 447.
Haddad, T. S.; Schwab, J.; Mather, P. T.; Romo–Uribe, A.; Otonari, Y.; Carr, M. J.; Lichtenhan, J. D. "The Rational Design of Silsesquioxane–Based Polymers", Conference Proceedings at ANTEC 1997, Toronto, Canada, Apr. 27, 1997, vol. 11–Materials, p. 1814.
Novak, B. M.; Ellsworth, M.W.; Verrier, C. "Organic–Inorganic Nanocomposite Materials, Mechanical and Thermal Properties," Polymeric Materials Science and Engineering, American Chemical Society Spring Meeting, 1994, San Diego, California, vol. 70, p. 266.

* cited by examiner

*Primary Examiner*—David J. Buttner
(74) *Attorney, Agent, or Firm*—William B. Lacy

(57) ABSTRACT

A golf ball comprising a core and a cover, wherein at least one of the core and the cover is formed of a composition comprising an organic, inorganic, or metallic nanoparticulate material having a particle size of less than about 1000 nm and at least one matrix material.

28 Claims, No Drawings

GOLF BALL COMPOSITIONS COMPRISING NANOPARTICULATES

FIELD OF THE INVENTION

This invention relates generally to golf ball component compositions and, in particular, compositions comprising nanoparticulates for improving golf ball performance.

BACKGROUND

Conventional golf balls can be divided into two general classes: solid and wound. Solid golf balls include one-piece, two-piece (i.e., solid core and a cover), and multi-layer (i.e., solid core of one or more layers and/or a cover of one or more layers) golf balls. Wound golf balls typically include a solid, hollow, or fluid-filled center, surrounded by a tensioned elastomeric material, and a cover. Solid balls have traditionally been considered longer and more durable than wound balls, but also lack the preferred "feel" provided by the wound construction.

By altering ball construction and composition, manufacturers can vary a wide range of playing characteristics, such as compression, velocity, "feel," and spin, each of which can be optimized for various playing abilities. In particular, a variety of core and cover layer(s) constructions, such as multi-layer balls having dual cover layers and/or dual core layers, have been investigated. These golf ball layers are typically constructed with a number of polymeric compositions and blends, including, but not limited to, polybutadiene rubber, polyurethanes, polyamides, and ethylene-based ionomers.

It is believed that blending nanoparticulate materials with these materials can improve the blend characteristics, such as dimensional stability, abrasion resistance, moisture transmission, and resiliency. Nanomaterials are unique because their size and shape can be selectively modified by chemical or other sources at an atomic or molecular level. These materials, therefore, provide novel and sometimes unusual material properties (even at lower loading levels), such as increased modulus (in some cases even lower hardness), elongation at break, optical property, barrier to moisture, abrasion resistance, low hysteresis, and surface appearance. These unique properties may then be transferred to a variety of golf ball components, such as those described herein.

SUMMARY OF THE INVENTION

The present invention is directed to a golf ball comprising a core and a cover, wherein at least one of the core and the cover is formed of a composition comprising an organic, inorganic, or metallic nanoparticulate material having a particle size of less than about 1000 nm and at least one matrix material.

The nanoparticulate material may include platelets having a diameter of about 0.9 nm to about 1000 nm and have an aspect ratio of about 100 to about 1000. The composition may further include a layered material comprising phyllosilicates, smectite clay minerals, montmorillonite, sodium montmorillonite; magnesium montmorillonite; calcium montmorillonite; nontronite; beidellite; volkonskoite; hectorite; saponite; sauconite; sobockite; stevensite; svinfordite; vermiculite; micaceous minerals; illite; mixed layered illite; smectite minerals; ledikite; admixtures of illites; and mixtures thereof. Preferably, the layered material comprises montmorillonite, nontronite, beidellite, volkonskoite, hectorite, saponite, sauconite, sobockite, stevensite, svinfordite, and mixtures thereof. If desired, the layered material can be swellable.

In one embodiment, the composition includes an inorganic material comprising chemically-modified montmorillonite clays; polymer grade montmorillonites; and mixtures thereof. Alternatively, the composition may include an organic material comprising polyhedral oligomeric silsequioxanes. The composition preferably includes a second nanomaterial., such as carbon nanotubes; Fullerenes; nanoscale titanium oxides; iron oxides; modified ceramics; and mixtures thereof.

The matrix material may include thermoplastics, thermoplastic elastomers, rubbers, thermoset materials, ionomers, copolyether-esters, copolyester-esters, copolyether-amides, copolyester-amides, thermoplastic urethanes, thermoset ureas, epoxy urethanes, epoxy ureas, phenolics, cross-linked polybutadiene rubbers, polyisoprenes, metallocene or single-site non-metallocene catalyzed polymers; and mixtures thereof. If a thermoset material is used, it can include polyamides; polyesters; polyurethanes; polycarbonates; polyepoxides; and mixtures thereof.

In a preferred embodiment, the composition comprises nano-zinc oxide. Typically, the ZnO is present in the core in an amount less than about 5 pph. When used at this concentration or lower, it is preferred that the resultant core have a COR of at least 0.820. Alternatively, the nanoparticulate is metallic or includes nano-tungsten, nano-zinc, nano-tin, or a mixture thereof.

While any ball construction if suitable, the core can include a solid, liquid, or gel-filled center, an outer core layer which can be a solid layer or a layer of tensioned elastomeric material, or a cover that includes an inner cover layer and an outer cover layer. Preferably, at least one of the inner and outer cover layers includes a thermoplastic or thermoset polyurethane or a thermoset polyurea. Ideally, the outer cover layer includes a saturated polyurethane.

The inner cover, if present, has a hardness, as measured on the ball, of less than about 75 Shore D, more preferably, between about 30 and about 70 Shore D, and, most preferably, between about 65 and about 70 Shore D; and a thickness of no greater than about 0.060 inches, more preferably, no greater than about 0.055 inches, and, most preferably, no greater than about 0.035 inches.

The golf ball has a compression of between about 70 and about 95. The cover has a hardness, as measured on the ball, of less than about 70 Shore D, more preferably no greater than about 61 Shore D, and most preferably no greater than about 55 Shore D.

The cover has a material hardness of less than about 70 Shore D, more preferably no greater than about 58 Shore D, and most preferably no greater than about 48 Shore D. The core has an outer diameter of no greater than about 1.620 inches, more preferably no greater than about 1.550 inches, and most preferably no greater than about 1.510 inches.

DEFINITIONS

As used herein, the terms "nanoparticulate" and "nanoparticle" refer to particle sizes, generally determined by diameter, less than about 1000 nm.

As used herein, the term "layered material" refers to an inorganic material, such as a smectite clay mineral, that is in the form of a plurality of adjacent, bound layers and has a maximum thickness, for each layer, of about 100 Å.

As used herein, the term "platelets" refers to individual layers of the layered material.

As used herein, the terms "intercalate" or "intercalated" refer to a layered material that includes oligomer and/or polymer molecules disposed between adjacent platelets of the layered material to increase the interlayer spacing between the adjacent platelets to at least 10 Å.

As used herein, the term "intercalation" refers to a process for forming an intercalate.

As used herein, the terms "exfoliate" or "exfoliated" refer to individual platelets of an intercalated layered material so that adjacent platelets of the intercalated layered material can be dispersed individually throughout a carrier material, such as a matrix polymer.

As used herein, the term "exfoliation" refers to a process for forming an exfoliate from an intercalate.

As used herein, the term "nanocomposite" refers to an oligomer, polymer or copolymer having dispersed therein a plurality of individual platelets obtained from an exfoliated, intercalated layered material.

As used herein, the term "matrix polymer" refers to a thermoplastic or thermosetting polymer in which the exfoliate is dispersed to form a nanocomposite.

As used herein, the terms "intercalant polymer" or "intercalant" refer to an oligomer or polymer that is sorbed between platelets of the layered material to form an intercalant.

As used herein the "interlayer spacing" refers to the distance between the internal faces of the adjacent layers as they are assembled in the layered material before delamination (exfoliation) takes place.

DETAILED DESCRIPTION

The golf balls of the present invention include a core and a cover surrounding the core. The core and/or the cover may have more than one layer and an intermediate layer may be disposed between the core and the cover of the golf ball. The golf ball cores of the present invention may comprise any of a variety of constructions. For example, the core of the golf ball may comprise a solid sphere or may be a solid center surrounded by at least one intermediate or outer core layer. The center of the core may also be a liquid filled sphere surrounded by at least one core layer. The intermediate layer or outer core layer may also comprise a plurality of layers. The core may also comprise a solid or liquid filled center around which tensioned elastomeric material is wound. The cover layer may be a single layer or, for example, may be formed of a plurality of layers, such as an inner cover layer and an outer cover layer.

While the various golf ball centers, cores, and layers may be formed of any materials known to those skilled in the art, the present invention is particularly directed to compositions comprising nanoparticulates. Nanoparticulates are generally divided into three categories: organic, inorganic, and metallic, all of which are suitable for use in compositions for golf ball components. Because of their minute size (particle size of less than about 1000 nm), a higher concentration of particles (greater surface area) are available to interact with the surrounding polymer or rubber materials, increasing their effect on the composition many times at concentrations much lower than conventionally required. For example, nanomaterials, such as nanoclays, can be chemically modified by inserting or intercalating chemistry into the spaces or "galleries" between the clay surfaces, resulting in a significant increase in the weight ratio of clay to PVP, from 80:20 to 20:80. As a result of this chemical modification, the nanoclays are fully dispersed in the host matrix like polymers and rubbers and this state is referred as "exfoliation."

Because of the nanometer-sized particles have such a large surface area, small quantities of nanomaterials can have an intimate interactions and compatibility with the host matrix not available to conventional-sized particles. These interactions can cause significant property changes in the compositions. For example, a 3% to 5% loading of nanoclay into a polymer blend will exhibit properties similar to 20% to 60% loading of conventional reinforcing agents such as kaolin, silica, talc, and carbon black. The resulting compositions are generally referred as "nanocomposites." Preferably, the nanoparticles of the present invention have a surface area of at least about 100 $m^2/g$, more preferably at least about 250 $m^2/g$, and most preferably at least about 500 $m^2/g$.

The nanomaterials typically have nanometer-thick platelets ranging from about 0.9 nm to about 1000 nm in diameter and have an aspect ratio of about 100 to about 1000. Any swellable layered material that sufficiently sorb the intercalant polymer to increase the interlayer spacing between adjacent platelets to at least about 10 Å (when the phyllosilicate is measured dry) may be used. Useful swellable layered materials include, but are not limited to, phyllosilicates, such as smectite clay minerals, e.g., montmorillonite, particularly sodium montmorillonite; magnesium montmorillonite; and/or calcium montmorillonite; nontronite; beidellite; volkonskoite; hectorite; saponite; sauconite; sobockite; stevensite; svinfordite; vermiculite; and the like.

Other useful layered materials include micaceous minerals, such as illite and mixed layered illite, and smectite minerals, such as ledikite, and admixtures of illites with the clay minerals named above. Other layered materials having little or no charge on the layers may be useful in this invention provided they can be intercalated with the intercalant polymers to expand their interlayer spacing to at least about 10 Å. Preferred swellable layered materials are phyllosilicates of the 2:1 type having a negative charge on the layers ranging from about 0.15 to about 0.9 charges per formula unit and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

The interlayer spacing is measured when the layered material is "air dry," e.g., contains 3% to 6% by weight water, based on the dry weight of the layered material. The preferred clay materials generally include interlayer cations, such as $Na^+$, $Ca^{+2}$, $K^+$, $Mg^{+2}$, $NH_4^+$, and the like, including mixtures thereof. In this state, these materials do not delaminate in host (matrix) polymer melts regardless of the degree of shear used in mixing, because their interlayer spacings are usually equal to or less than about 4 Å. Consequently, the interlayer cohesive force is relatively strong.

Preferably, the composition of the present invention comprises inorganic nanomaterials, such as chemically modified montmorillonite clays "nanomers" and polymer grade montmorillonites, commercially available from Nanocor Company of Arlington Heights, Ill., and CLOISITE®, commercially available from Southern Clay Products of Widner, United Kingdom.

The compositions of the present invention may also comprise organic nanomaterials like polyhedral oligomeric silsequioxanes essentially chemically modified nano-scale particles of silica. Examples of these materials include POSS®, commercially available from Hybrid Plastics of Fountain Valley, Calif.

The compositions of the present invention may also include other nanomaterials including, but not limited to, carbon nanotubes; Fullerenes; nanoscale titanium oxides; iron oxides; ceramics; modified ceramics, such as organic/inorganic hybrid polymers; metal and oxide powders (ultrafine and superfine); titanium dioxide particles; single-wall and multi-wall carbon nanotubes; polymer nanofibers; carbon nanofibrils; nitrides; carbides; sulfides; gold nanoparticles; and mixtures thereof.

The nanomaterials can be blended with thermoplastics, thermoplastic elastomers, rubbers, and thermoset materials useful in making golf ball components. The nanoparticulates can be incorporated either during blending operation such as in single or twin-screw extruders or in rubber mixing equipment like brabender or internal mixers. Also, the nanoparticulates can be blended in a reactor during the polymerization of thermoplastic or thermoset or rubbery materials.

Thermoplastic resins and rubbers for use as the matrix polymer and/or as an intercalant polymer, in the practice of this invention may vary widely. Illustrative of useful thermoplastic resins, which may be used alone or in admixture, include, but are not limited to, polylactones such as poly(pivalolactone), poly(caprolactone) and the like; polyurethanes derived from reaction of diisocyanates such as 1,5-naphthalene diisocyanate; p-phenylene diisocyanate, m-phenylene diisocyanate, 2,4-toluene diisocyanate, 4,4'-diphenylmethane diisocyanate, 3,3'-dimethyl-4,4'-diphenylmethane diisocyanate, 3,3-'dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyanatodiphenylmethane, and the like.

Also suitable are linear long-chain diols such as poly(tetramethylene adipate), poly(ethylene adipate), poly(1,4-butylene adipate), poly(ethylene succinate), poly(2,3-butylene succinate), polyether diols and the like; polycarbonates such as poly[methane bis(4-phenyl) carbonate], poly[1,1-ether bis(4-phenyl)carbonate], poly[diphenylmethane bis(4-phenyl)carbonate], poly[1,1-cyclohexane bis(4-phenyl)carbonate] and the like; polysulfones; polyethers; polyketones; polyamides such as poly(4-amino butyric acid), poly(hexamethylene adipamide), poly(6-aminohexanoic acid), poly(m-xylylene adipamide), poly(p-xylylene sebacamide), poly(2,2,2-trimethyl hexamethylene terephthalamide), poly(metaphenylene isophthalamide) (NOMEX®), poly(p-phenylene terephthalamide) (KEVLAR®), and the like; polyesters such as poly(ethylene azelate), poly(ethylene-1,5-naphthalate, poly(1,4-cyclohexane dimethylene terephthalate), poly(ethylene oxybenzoate) (A-TELL®), poly(para-hydroxy benzoate) (EKONOL®), poly(1,4-cyclohexylidene dimethylene terephthalate) (KODEL®), poly(1,4-cyclohexylidene dimethylene terephthalate) (KODEL®), polyethylene terephthalate, polybutylene terephthalate, polytrimethylene terepthalate ("PTT"), and the like; poly(arylene oxides) such as poly(2,6-dimethyl-1,4-phenylene oxide), poly(2,6-diphenyl-1,4-phenylene oxide) and the like; poly(arylene sulfides) such as poly(phenylene sulfide), and the like.

Further suitable polymers include, but are not limited to polyetherimides; vinyl polymers and their copolymers such as polyvinyl acetate, polyvinyl alcohol, polyvinyl chloride; polyvinyl butyral, polyvinylidene chloride, ethylene-vinyl acetate copolymers, and the like; polyacrylics, polyacrylate and their copolymers such as polyethyl acrylate, poly(n-butyl acrylate), polymethylmethacrylate, polyethyl methacrylate, poly(n-butyl methacrylate), poly(n-propyl methacrylate), polyacrylamide, polyacrylonitrile, polyacrylic acid, ethylene-acrylic acid copolymers, ethylene-vinyl alcohol copolymers acrylonitrile copolymers, methyl methacrylate-styrene copolymers, ethylene-ethyl acrylate copolymers, methacrylated butadiene-styrene copolymers, and the like; polyolefins such as low density poly(ethylene), poly(propylene), chlorinated low density poly(ethylene), poly(4-methyl-1-pentene), poly(ethylene), poly(styrene), and the like; ionomers; poly(epichlorohydrins); and polysulfones, such as the reaction product of the sodium salt of 2,2-bis(4-hydroxyphenyl)propane and 4,4'-dichlorodiphenyl sulfone; furan resins, such as poly(furan); cellulose ester plastics, such as cellulose acetate, cellulose acetate butyrate, cellulose propionate, and the like; silicones such as poly(dimethyl siloxane), poly(dimethyl siloxane), poly(dimethyl siloxane co-phenylmethyl siloxane), and the like; protein plastics; and blends of two or more of the foregoing.

Preferably, the nanomaterials can be blended with materials such as ionomers, copolyether-ester, copolyester-ester, copolyether-amide, copolyester-amide, thermoplastic urethanes, metallocene or single-site non-metallocene catalyzed polymers, polyamides, liquid crystal polymers, as well as other polymers mentioned in U.S. Pat. Nos. 6,124,389; 6,025,442; and 6,001,930, the disclosure of which are incorporated herein, in their entirety, by express reference thereto.

Vulcanizable and thermoplastic rubbers useful as the matrix polymer and/or as a water insoluble intercalant polymer, in the practice of this invention may also vary widely. Examples include but are not limited to, brominated butyl rubber, chlorinate butyl rubber, polyurethane elastomers, fluoroelastomers, polyester elastomers, polyvinylchloride, butadiene/acrylonitrile elastomers, silicone elastomers, poly(butadiene), poly(isoprene), poly(isobutylene), ethylene-propylene copolymers, ethylene-propylene-diene terpolymers, sulfonated ethylene-propylene-diene terpolymers, poly(chloroprene), poly(2,3-dimethylbutadiene), poly(butadiene-pentadiene), chlorosulphonated poly(ethylenes), poly(sulfide) elastomers, block copolymers made up of segments of glassy or crystalline blocks such as poly(styrene), poly(vinyltoluene), poly(t-butyl styrene), polyesters and the like and the elastomeric blocks such as poly(butadiene), poly(isoprene), ethylene-propylene copolymers, ethylene-butylene copolymers, polyether and the like as for example the copolymers in poly(styrene)-poly(butadiene)-poly(styrene) block copolymer manufactured by Shell Chemical Company of Houston, Tex., under the trade name KRATON®.

Useful thermosetting resins include, but are not limited to, polyamides; polyalkylamides; polyesters; polyurethanes; polycarbonates; polyepoxides; and mixtures thereof. Thermoset resins based on water-soluble prepolymers, include prepolymers based on formaldehyde: phenols (phenol, cresol and the like); urea; melamine; melamine and phenol; urea and phenol. Polyurethanes based on: toluene diisocyanate ("TDI") and monomeric and polymeric diphenyl methanediisocyanates ("MDI"), p-phenylenediisocynate ("PPDI"); hydroxy terminated polyethers (polyethylene glycol, polypropylene glycol, copolymers of ethylene oxide and propylene oxide and the like); amino terminated polyethers, polyamines (tetramethylene diamine, ethylenediamine, hexamethylenediamine, 2,2-dimethyl 1,3-propanediamine; melamine, diaminobenzene, triaminobenzene and the like); polyamidoamines (for instance, hydroxy terminated polyesters); unsaturated polyesters based on maleic and fumaric anhydrides and acids; glycols (ethylene, propylene), polyethylene glycols, polypropylene glycols, aromatic glycols and polyglycols; unsaturated polyesters based on vinyl, allyl and acryl monomers; epoxides, based on biphenol A (2,2'-bis(4-hydroxyphenyl)propane) and epichlorohydrin; epoxy prepolymers based on monoepoxy and polyepoxy compounds and α,β-unsaturated compounds (styrene, vinyl, allyl, acrylic monomers); polyamides 4-tetramethylene diamine, hexamethylene diamine, melamine, 1,3-propanediamine, diaminobenzene, triaminobenzene, 3,3',4,4'-bitriaminobenzene; 3,3',4,4'-biphenyltetramine and the like).

Also suitable are polyethyleneimines; amides and polyamides (amides of di-, tri-, and tetra acids); hydroxyphenols (pyrogallol, gallic acid, tetrahydroxybenzophenone, tetrahydroquinone, catechol, phenol and the like); anhydrides and polyandrides of di-, tri-, and tetraacids; polyisocyanurates based on TDI and MDI; polyimides based on pyromellitic dianhydride and 1,4-phenyldiamine; polybenzimidozoles based on 33',44'-biphenyltetramine and isophthalic acid; polyamide based on unsaturated dibasic acids and anhydrides (maleic, fumaric) and aromatic polyamides; alkyd resins based on dibasic aromatic acids or anhydrides, glycerol, trimethylolpropane, pentaerythritol, sorbitol and unsaturated fatty long chain carboxylic acids (the latter derived from vegetable oils); and prepolymers based on acrylic monomers (hydroxy or carboxy functional).

In addition, the nanoparticulates can be incorporated in the polyurethane, polyurea and epoxy and their ionomeric derivatives and IPN polymers that are known in the golf ball compositions. This can be achieved by various processes like casting, reaction injection molding and other process that are well known in the art. Further, the nanomaterials can also be used in ink and paint formulations to improve its mechanical properties and abrasion resistant. The nanomaterials can be present any where between about 0.5 and about 20 weight percent in the compositions of the present invention.

In a preferred embodiment of the present invention, the polymer composition, typically a polybutadiene rubber based rubber composition, comprises nanoparticulate zinc oxide ("ZnO"), which has an average particle diameter of less than 1 μm (1000 nm). Conventional ZnO ranges in size from about 1 μm to about 50 μm. Without wishing to be bound by any particular theory it is believed that the smaller particle size of the nanoparticulate ZnO, which has a much larger active surface area than does convention ZnO, allows the ZnO nanoparticles to "participate" more intricately in the formation and development of the polybutadiene properties. An example of nanoparticulate ZnO includes NANOX®, which is commercially available from Elementis of Gent, Belgium. Other non-reacting, high-specific nanoparticulates that are suitable for the blends of the present invention include tungsten, tungsten trioxide, tungsten carbide, bismuth trioxide, tin oxide, nickel, aluminum oxide, iron oxide, and mixtures thereof.

An example of the benefit of the use of nanoparticulate ZnO in golf ball cores can be seen below. Solid cores having a diameter of 1.58 inches were made using 28 pph zinc diacrylate, 0.5 pph TRIGONOX® 265, and in BUNA® CB-23 butadiene rubber. The only difference is the type and amount of ZnO, tabulated at varying levels and presented in Table 1 below.

TABLE 1

Effect of Nanoparticulates on Core Properties

| Parts ZnO | Core Volume (cm$^3$) | Core Weight (g) | Density (g/cm$^3$) | Modulus (psi) | Atti compression | CoR @ 125 fps |
|---|---|---|---|---|---|---|
| Plant ZnO | | | | | | |
| 0.0 | 34.555 | 35.89 | 1.04 | 5800 | 47.2 | 0.797 |
| 1.0 | 34.555 | 35.98 | 1.04 | 7100 | 61.6 | 0.811 |
| 5.0 | 34.101 | 36.51 | 1.07 | 8700 | 76.2 | 0.818 |
| 13.0 | 34.038 | 38.16 | 1.12 | 9600 | 83.2 | 0.817 |
| 21.0 | 33.907 | 39.83 | 1.17 | 10400 | 89.0 | 0.814 |
| Nanox ZnO | | | | | | |
| 1.0 | 34.101 | 35.66 | 1.05 | 8300 | 72.8 | 0.820 |
| 5.0 | 34.036 | 36.43 | 1.07 | 9900 | 85.4 | 0.824 |
| 13.0 | 33.843 | 38.02 | 1.12 | 10500 | 89.7 | 0.820 |
| 21.0 | 33.779 | 39.66 | 1.17 | 10900 | 92.3 | 0.816 |
| W | | | | | | |
| 5.0 | 34.165 | 38.27 | 1.12 | 8600 | 75.4 | 0.813 |
| 5.0 | 34.230 | 40.06 | 1.17 | 8700 | 76.2 | 0.810 |

It is clear from the above Table 1 that two different trends are present. First, when identical pph of nano-ZnO and conventional ZnO (Plant ZnO) are used, the nano-ZnO results in a higher compression and, therefore, a "faster" core (see the COR values). Second, a much lower concentration of the nano-ZnO is required to achieve a comparable COR to that of conventional ZnO.

The materials for solid cores, which can be blended with the above nanoparticulates, include compositions having a base rubber, a crosslinking agent, a filler, and a co-crosslinking or initiator agent. The base rubber typically includes natural or synthetic rubbers. A preferred base rubber is 1,4-polybutadiene having a cis-structure of at least 40%. Most preferably, the base rubber comprises high-Mooney-viscosity rubber but it should be understood that rubbers having Mooney viscosity of any value are acceptable. Preferably, the base rubber has a Mooney viscosity of between about 30 and about 120. If desired, the polybutadiene can also be mixed with other elastomers known in the art such as natural rubber, polyisoprene rubber and/or styrene-butadiene rubber in order to modify the properties of the core.

The crosslinking agent includes a metal salt of an unsaturated fatty or non-fatty acid such as a zinc salt or a magnesium salt of an unsaturated fatty or non-fatty acid having 3 to 8 carbon atoms such as acrylic or methacrylic acid. Suitable cross linking agents include one or more metal salt diacrylates, dimethacrylates and monomethacrylates wherein the metal is magnesium, calcium, zinc, aluminum, sodium, lithium or nickel. Preferred acrylates include zinc acrylate, zinc diacrylate, zinc methacrylate, and zinc dimethacrylate, and mixtures thereof. The crosslinking agent is typically present in an amount greater than about 10 phr of the polymer component, preferably from about 10 to 40 phr of the polymer component, more preferably from about 10 to 30 phr of the polymer component.

The initiator agent can be any known polymerization initiator which decomposes during the cure cycle. Suitable initiators include peroxide compounds such as dicumyl peroxide, 1,1-di(t-butylperoxy) 3,3,5-trimethyl cyclohexane, a-a bis(t-butylperoxy)diisopropylbenzene, 2,5-dimethyl-2,5di(t-butylperoxy)hexane or di-t-butyl peroxide and mixtures thereof.

Density-adjusting fillers typically include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, and the like.

Fillers added to one or more portions of the golf ball typically include processing aids or compounds to affect rheological and mixing properties, density-modifying fillers, tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

The invention also includes a method to convert the cis-isomer of the polybutadiene resilient polymer component to the trans-isomer during a molding cycle and to form a golf ball. A variety of methods and materials have been disclosed in U.S. Pat. No. 6,162,135 and U.S. application Ser. No. 09/461,736, filed Dec. 16, 1999; Ser. No. 09/458,676, filed Dec. 10, 1999; and Ser. No. 09/461,421, filed Dec. 16, 1999, each of which are incorporated herein, in their entirety, by reference.

The materials used in forming either the golf ball center or any portion of the core, in accordance with the invention, may be combined to form a mixture by any type of mixing known to one of ordinary skill in the art. Suitable types of mixing include single pass and multi-pass mixing. Suitable mixing equipment is well known to those of ordinary skill in the art, and such equipment may include a Banbury mixer, a two-roll mill, or a twin screw extruder.

Conventional mixing speeds for combining polymers are typically used. The mixing temperature depends upon the type of polymer components, and more importantly, on the type of free-radical initiator. Suitable mixing speeds and temperatures are well-known to those of ordinary skill in the art, or may be readily determined without undue experimentation.

The mixture can be subjected to, e.g., a compression or injection molding process, to obtain solid spheres for the center or hemispherical shells for forming an intermediate layer. The temperature and duration of the molding cycle are selected based upon reactivity of the mixture. The molding cycle may have a single step of molding the mixture at a single temperature for a fixed time duration. The molding cycle may also include a two-step process, in which the polymer mixture is held in the mold at an initial temperature for an initial duration of time, followed by holding at a second, typically higher temperature for a second duration of time. In a preferred embodiment of the current invention, a single-step cure cycle is employed. The materials used in forming either the golf ball center or any portion of the core, in accordance with the invention, may be combined to form a golf ball by an injection molding process, which is also well-known to one of ordinary skill in the art. Although the curing time depends on the various materials selected, those of ordinary skill in the art will be readily able to adjust the curing time upward or downward based on the particular materials used and the discussion herein.

The cover provides the interface between the ball and a club. Properties that are desirable for the cover include good moldability, high abrasion resistance, high tear strength, high resilience, and good mold release. The cover typically has a thickness to provide sufficient strength, good performance characteristics, and durability. The cover preferably has a thickness of less than about 0.1 inches, preferably, less than about 0.05 inches, more preferably, between about 0.02 inches and about 0.04 inches, and most preferably, between about 0.025 and about 0.035 inches. The invention is particularly directed towards a multilayer golf ball which comprises a core, an inner cover layer, and an outer cover layer. In this embodiment, preferably, at least one of the inner and outer cover layer has a thickness of less than about 0.05 inches, more preferably between about 0.02 inches and about 0.04 inches. Most preferably, the thickness of either layer is about 0.03 inches.

When the golf ball of the present invention includes an inner cover layer, this layer can include any materials known to those of ordinary skill in the art, including thermoplastic and thermosetting material, but preferably the inner cover can include any suitable materials, such as ionic copolymers of ethylene and an unsaturated monocarboxylic acid which are available under the trademark SURLYN® of E.I. DuPont de Nemours & Co., of Wilmington, Del., or IOTEK® or ESCOR® of Exxon. These are copolymers or terpolymers of ethylene and methacrylic acid or acrylic acid partially neutralized with salts of zinc, sodium, lithium, magnesium, potassium, calcium, manganese, nickel or the like, in which the salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

The ionomers and/or their acid precursors are preferably fully neutralized with organic acid copolymers or the salts thereof. The acid copolymers are preferably α-olefin, such as ethylene, $C_{3-8}$ α,β-ethylenically unsaturated carboxylic acid, such as acrylic and methacrylic acid, copolymers. They may optionally contain a softening monomer, such as alkyl acrylate and alkyl methacrylate, wherein the alkyl groups have from 1 to 8 carbon atoms.

The acid copolymers can be described as E/X/Y copolymers where E is ethylene, X is an α,β-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

Ionomers are typically neutralized with a metal cation, such as Li, Na, Mg, or Zn. It has been found that by adding sufficient organic acid or salt of organic acid, along with a suitable base, to the acid copolymer or ionomer, however, the ionomer can be neutralized, without losing processability, to a level much greater than for a metal cation. Preferably, the acid moieties are neutralized greater than about 80%, preferably from 90-100%, most preferably 100% without losing processability. This accomplished by melt-blending an ethylene α,β-ethylenically unsaturated carboxylic acid copolymer, for example, with an organic acid or a salt of organic acid, and adding a sufficient amount of a cation source to increase the level of neutralization of all the acid moieties (including those in the acid copolymer and in the organic acid) to greater than 90%, (preferably greater than 100%).

The golf balls can likewise include one or more homopolymeric or copolymeric inner cover materials, which also may be blended with the above listed nanoparticulates, and include:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly(caprolactam), and blends of polyamides with SURLYN®, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as polyurethanes (both aromatic and aliphatic); olefinic thermoplastic rubbers, such as blends of polyolefins with ethylene-propylene-non-conjugated diene terpolymer; block copolymers of styrene and butadiene, isoprene or ethylene-butylene rubber; or copoly (ether-amide), such as PEBAX®, sold by ELF Atochem of Philadelphia, Pa.;

(8) Polyphenylene oxide resins or blends of polyphenylene oxide with high impact polystyrene as sold under the trademark NORYL® by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL® by E.I. DuPont de Nemours & Co. of Wilmington, Del., and LOMOD® by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

Preferably, the inner cover includes polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethelyne vinyl alcohol), poly (tetrafluoroethylene) and their copolymers including functional comonomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent.

While the outer cover layers of the present invention may be formed from many of the inner cover layer materials, in a preferred embodiment, the outer cover includes a thermoplastic or thermoset polyurethane composition comprising the reaction product of at least one polyisocyanate, polyol, and at least one curing agent. Most preferably, the outer cover layer comprise blends of polyurethanes and the nanoparticulates listed above. Any polyisocyanate available to one of ordinary skill in the art is suitable for use according to the invention. Exemplary polyisocyanates include, but are not limited to, 4,4'-diphenylmethane diisocyanate; polymeric MDI; carbodiimide-modified liquid MDI; 4,4'-dicyclohexylmethane diisocyanate ("$H_{12}$MDI"); p-phenylene diisocyanate, m-phenylene diisocyanate ("MPDI"); toluene diisocyanate 3,3'-dimethyl-4,4'-biphenylene diisocyanate ("TODI"); isophoronediisocyanate ("IPDI"); hexamethylene diisocyanate ("HDI"); naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"); tetracene diisocyanate; napthalene diisocyanate; anthracene diisocyanate; isocyanurate of toluene diisocyanate; uretdione of hexamethylene diisocyanate; and mixtures thereof. Polyisocyanates are known to those of ordinary skill in the art as having more than one isocyanate group, e.g., di-isocyanate, tri-isocyanate, and tetra-isocyanate. Preferably, the polyisocyanate includes MDI, PPDI, TDI, or a mixture thereof, and more preferably, the polyisocyanate includes MDI. It should be understood that, as used herein, the term MDI includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate should have less than about 14% unreacted NCO groups. Preferably, the at least one polyisocyanate has no greater than about 7.5% NCO, and more preferably, less than about 7.0%.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material of the invention. Suitable polyester polyols include, but are not limited to, polyethylene adipate glycol; polybutylene adipate glycol; polyethylene propylene adipate glycol; o-phthalate-1,6-hexanediol; poly(hexamethylene adipate)glycol; and mixtures thereof. The hydrocarbon chain can have saturated or unsaturated bonds, or substituted or unsubstituted aromatic and cyclic groups.

In another embodiment, polycaprolactone polyols are included in the materials of the invention. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, the polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

Polyamine curatives are also suitable for use in the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline) ("MCDEA"); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); 4,4'-diamino-3,3'-diethyl-5,5'-dimethyl diphenylmethane; 2,2',3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE® 300, commercially available from Albermarle Corporation of Baton Rouge, La. Suitable polyamine curatives, which include both primary and secondary amines, preferably have molecular weights ranging from about 64 to about 2000.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(β-hydroxyethyl)ether; hydroquinone-di-(β-hydroxyethyl)ether; and mixtures thereof. Preferred hydroxy-terminated curatives include 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol, and mixtures thereof. Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In a preferred embodiment of the present invention, saturated polyurethanes are used to form cover layers, preferably the outer cover layer, and may be selected from among both castable thermoset and thermoplastic polyurethanes. In this embodiment, the saturated polyurethanes of the present invention are substantially free of aromatic groups or moieties. Saturated polyurethanes suitable for use in the invention are a product of a reaction between at least one polyurethane prepolymer and at least one saturated curing agent. The polyurethane prepolymer is a product formed by a reaction between at least one saturated polyol and at least one saturated diisocyanate. As is well known in the art, a catalyst may be employed to promote the reaction between the curing agent and the isocyanate and polyol.

Other suitable materials which may be combined with the polyurethanes in forming the cover and/or intermediate layer(s) of the golf balls of the invention include ionic or non-ionic polyurethanes and polyureas, epoxy resins, polyethylenes, polyamides and polyesters. For example, the cover and/or intermediate layer may be formed from a blend of at least one saturated polyurethane and thermoplastic or thermoset ionic and non-ionic urethanes and polyurethanes, cationic urethane ionomers and urethane epoxies, ionic and non-ionic polyureas and blends thereof. Examples of suitable urethane ionomers are disclosed in U.S. Pat. No. 5,692,974, the disclosure of which is hereby incorporated by reference in its entirety. Other examples of suitable polyurethanes are described in U.S. Pat. No. 5,334,673. Examples of appropriate polyureas are discussed in U.S. Pat. No. 5,484,870 and examples of suitable polyurethanes cured with epoxy group containing curing agents are disclosed in U.S. Pat. No. 5,908,358, the disclosures of which are hereby incorporated herein by reference in their entirety.

A variety of conventional components can be added to the cover compositions of the present invention. These include, but are not limited to, white pigment such as $TiO_2$, ZnO, optical brighteners, surfactants, processing aids, foaming agents, density-controlling fillers, UV stabilizers and light stabilizers. Saturated polyurethanes are resistant to discoloration. However, they are not immune to deterioration in their mechanical properties upon weathering. Addition of UV absorbers and light stabilizers therefore helps to maintain the tensile strength and elongation of the saturated polyurethane elastomers. Suitable UV absorbers and light stabilizers include TINUVIN® 328, TINUVIN® 213, TINUVIN® 765, TINUVIN® 770 and TINUVIN® 622. The preferred UV absorber is TINUVIN® 328, and the preferred light stabilizer is TINUVIN® 765. TINUVIN® products are available from Ciba-Geigy. Dyes, as well as optical brighteners and fluorescent pigments may also be included in the golf ball covers produced with polymers formed according to the present invention. Such additional ingredients may be added in any amounts that will achieve their desired purpose.

Any known method may be used to form the polyurethane components of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition. Other methods suitable for forming the layers of the present invention include reaction injection molding ("RIM"), liquid injection molding ("LIM"), and pre-reacting the components to form an injection moldable thermoplastic polyurethane and then injection molding, all of which are known to one of ordinary skill in the art.

Additional components which can be added to the polyurethane composition include UV stabilizers and other dyes, as well as optical brighteners and fluorescent pigments and dyes. Such additional ingredients may be added in any amounts that will achieve their desired purpose.

It has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers.

The castable, reactive liquid employed to form the urethane elastomer material can be applied over the core using a variety of application techniques such as spraying, dipping, spin coating, or flow coating methods which are well known in the art. An example of a suitable coating technique is that which is disclosed in U.S. Pat. No. 5,733,428, the disclosure of which is hereby incorporated by reference in its entirety in the present application.

The outer cover is preferably formed around the inner cover by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in motorized mixer including mixing head by feeding through lines metered amounts of curative and prepolymer. Top preheated mold halves are filled and placed in fixture units using centering pins moving into holes in each mold. At a later time, a bottom mold half or a series of bottom mold halves have similar mixture amounts introduced into the cavity. After the reacting materials have resided in top mold halves for about 40 to about 80 seconds, a core is lowered at a controlled speed into the gelling reacting mixture.

A ball cup holds the ball core through reduced pressure (or partial vacuum). Upon location of the coated core in the halves of the mold after gelling for about 40 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling.

Similarly, U.S. Pat. Nos. 5,006,297 and 5,334,673 disclose suitable molding techniques which may be utilized to apply the castable reactive liquids employed in the present invention. Further, U.S. Pat. Nos. 6,180,040 and 6,180,722 disclose methods of preparing dual core golf balls. The disclosures of these patents are hereby incorporated by reference in their entirety. However, the method of the invention is not limited to the use of these techniques.

Depending on the desired properties, balls prepared according to the invention can exhibit substantially the same or higher resilience, or coefficient of restitution ("COR"), with a decrease in compression or modulus, compared to balls of conventional construction. Additionally, balls prepared according to the invention can also exhibit substantially higher resilience, or COR, without an increase in compression, compared to balls of conventional construction. Another measure of this resilience is the "loss tangent," or tan δ, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked reaction product material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

The molding process and composition of golf ball portions typically results in a gradient of material properties. Methods employed in the prior art generally exploit hardness to quantify these gradients. Hardness is a qualitative measure of static modulus and does not represent the modulus of the material at the deformation rates associated with golf ball use, i.e., impact by a club. As is well known to one skilled in the art of polymer science, the time-temperature superposition principle may be used to emulate alternative deformation rates. For golf ball portions including polybutadiene, a 1-Hz oscillation at temperatures between 0° C. and −50° C. are believed to be qualitatively equivalent to golf ball impact rates. Therefore, measurement of loss tangent and dynamic stiffness at 0° C. to −50° C. may be used to accurately anticipate golf ball performance, preferably at temperatures between about −20° C. and −50° C.

The resultant golf balls typically have a coefficient of restitution of greater than about 0.75, preferably greater than about 0.79, and more preferably greater than about 0.81. The golf balls also typically have an Atti compression of at least about 50, preferably from about 60 to about 100, and more preferably from about 70 to about 95. The cover of the golf ball of the present invention has a hardness, as measured on the ball, of less than about 70 Shore D, more preferably, no greater than about 61 Shore D, and most preferably, no greater than about 55. When hardness is measured on a slab or button (material hardness) as measured by ASTM-D2240, the cover of the golf ball of the present invention has a material hardness of less than about 70 Shore D, more preferably, no greater than about 58 Shore D, and most preferably, no greater than about 48. The casing or inner cover layer, if present, preferably has a hardness, as measured on the ball (structure of the inner cover layer plus the core), of less than about 75 Shore D, more preferably between about 30 and about 70 Shore D, and most preferably, between about 65 and about 70 Shore D. In a more preferred embodiment, a ratio of the casing material hardness to the outer cover layer material hardness is greater than 1.5.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

The core composition should comprise at least one rubber material and nanoparticulate, such that it has a resilience index of at least about 40. Preferably the resilience index is at least about 50. When golf balls are prepared according to the invention, they typically will have dimple coverage greater than about 60 percent, preferably greater than about 65 percent, and more preferably greater than about 75 percent. The flexural modulus of the cover on the golf balls, as measured by ASTM method D6272-98, Procedure B, is typically greater than about 500 psi, and is preferably from about 500 psi to 150,000 psi.

The core of the present invention has an Atti compression of less than about 90, more preferably, less than about 80, and most preferably, less than about 50. The overall outer diameter of the core is less than about 1.620 inches, preferably, no greater than 1.580 inches, more preferably no greater than about 1.550 inches, and most preferably no greater than about 1.510 inches. The casing or inner cover layer preferably has a thickness of no greater than about 0.060 inches, more preferably, no greater than about 0.055 inches, and most preferably, no greater than about 0.035 inches.

The present multilayer golf ball can have an overall diameter of any size. Although the United States Golf Association ("USGA") specifications limit the minimum size of a competition golf ball to 1.680 inches. There is no specification as to the maximum diameter. Golf balls of any size, however, can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

The golf balls of the present invention should have a moment of inertia ("MOI") of less than about 85 and, preferably, less than about 83. The MOI is typically measured on model number MOI-005-104 Moment of Inertia Instrument manufactured by Inertia Dynamics of Collinsville, Conn. The instrument is plugged into a PC for communication via a COMM port and is driven by MOI Instrument Software version #1.2.

As used herein, the term "about," used in connection with one or more numbers or numerical ranges, should be understood to refer to all such numbers, including all numbers in a range.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising a core, an intermediate layer, and a cover, wherein the core has an outer diameter of 1.550 inches to 1.620 inches and is formed of a composition comprising a base rubber and a ZnO nanoparticulate material having a particle size of less than about 1000 nm and at least one material selected from the group consisting of thermoplastics, thermoplastic elastomers, ionomers, copolyether-esters, copolyester-esters, copolyether-amides, copolyester-amides, thermoplastic urethane, thermoset ureas, epoxy urethanes, epoxy ureas, phenolics, and metallocene or single-site non-metallocene catalyzed polymers, and the intermediate layer has a thickness of 0.035 inches or less and comprises a material selected from the group consisting of thermoplastic elastomers, ionomers, copolyether-amides, copolyester-amides, thermoset ureas, epoxy urethanes, epoxy ureas, phenolics, and metallocene or single-site non-metallocene catalyzed polymers.

2. The golf ball of claim 1, wherein the composition further comprises a layered material comprising phyllosilicates, smectite clay minerals, montmorillonite, sodium montmorillonite; magnesium montmorillonite; calcium montmorillonite; nontronite; beidellite; volkonskoite; hectorite; saponite; sauconite; sobockite; stevensite svinfordite; vermiculite; micaceous minerals; illite; mixed layered illite; smectite minerals; ledikite; admixtures of illites and mixtures thereof.

3. The golf ball of claim 2, wherein the layered material comprises montmorillonite, nontronite, beidellite, volronskoite, hectorite, saponite, sauconite, sobockite, stevensite, svinfordite, and mixtures thereof.

4. The golf ball of claim 2, wherein the layered material is swellable.

5. The golf ball of claim 1, wherein the composition comprises an inorganic material comprising chemically-modified montmorillonite clays; polymer grade montmorillonites; and mixtures thereof.

6. The golf ball of claim 1, wherein the composition comprises an organic material comprising polyhedral oligomeric silsequioxanes.

7. The golf ball of claim 1, wherein the composition further comprises a second nanomaterial.

8. The golf ball of claim 7, wherein the second nanomaterial comprises carbon nanotubes; Fullerenes; nanoscale titanium oxides; iron oxides; modified ceramics; and mixtures thereof.

9. The golf ball of claim 1, wherein the ZnO is present in the core in an amount less than about 5 pph.

10. The golf ball of claim 1, wherein the core comprises a solid, liquid, or gel-filled center.

11. The golf ball of claim 1, wherein the core comprises an outer core layer.

12. The golf ball of claim 11, wherein the outer core layer is a solid layer or a layer of tensioned elastomeric material.

13. The golf ball of claim 1, wherein the cover comprises an inner cover layer and an outer cover layer.

14. The golf ball of claim 13, wherein at least one of the inner and outer cover layers comprises a thermoplastic or thermoset polyurethane or thermoset polyurea.

15. The golf ball of claim 13, wherein the outer cover layer comprises saturated polyurethane.

16. The golf ball of claim 13, wherein the inner cover has a hardness, as measured on the ball, of less than about 75 Shore D.

17. The golf ball of claim 16, wherein the inner cover hardness, as measured on the ball, is between about 30 and about 70 Shore D.

18. The golf ball of claim 16, wherein the inner cover hardness, as measured on the ball, is between about 65 and about 70 Shore D.

19. The golf ball of claim 13, wherein the inner cover layer has a thickness of no greater than about 0.060 inches.

20. The golf ball of claim 19, wherein the inner cover layer has a thickness of no greater than about 0.055 inches.

21. The golf ball of claim 20, wherein the inner cover layer has a thickness of no greater than about 0.035 inches.

22. The golf ball of claim 1, wherein the golf ball has a compression of between about 70 and about 95.

23. The golf ball of claim 1, wherein the cover has a hardness, as measured on the ball, of less than about 70 Shore D.

24. The golf ball of claim 23, wherein the cover hardness, as measured on the ball, is no greater than about 61 Shore D.

25. The golf ball of claim 24, wherein the cover hardness, as measured on the ball, is no greater than about 55 Shore D.

26. The golf ball of claim 1, wherein the cover has a material hardness of less than about 70 Shore D.

27. The golf ball of claim 26, wherein the cover has a material hardness of no greater than about 58 Shore D.

28. The golf ball of claim 27, wherein the cover has a material hardness of no greater than about 48 Shore D.

* * * * *